(12) United States Patent
Finn et al.

(10) Patent No.: US 11,195,289 B2
(45) Date of Patent: Dec. 7, 2021

(54) BUILDING MANAGEMENT SYSTEM USING OBJECT DETECTION AND TRACKING IN A LARGE SPACE WITH A LOW RESOLUTION SENSOR

(71) Applicant: Carrier Corporation, Palm Beach Gardens, FL (US)

(72) Inventors: Alan Matthew Finn, Hebron, CT (US); Ziyou Xiong, Wethersfield, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 132 days.

(21) Appl. No.: 16/070,945

(22) PCT Filed: Jan. 19, 2017

(86) PCT No.: PCT/US2017/014016
§ 371 (c)(1),
(2) Date: Jul. 18, 2018

(87) PCT Pub. No.: WO2017/127474
PCT Pub. Date: Jul. 27, 2017

(65) Prior Publication Data
US 2019/0026908 A1    Jan. 24, 2019

Related U.S. Application Data

(60) Provisional application No. 62/280,942, filed on Jan. 20, 2016.

(51) Int. Cl.
*G06K 9/00* (2006.01)
*G06T 7/254* (2017.01)
*G06T 7/277* (2017.01)

(52) U.S. Cl.
CPC .............. *G06T 7/254* (2017.01); *G06T 7/277* (2017.01); *G06T 2207/10048* (2013.01);
(Continued)

(58) Field of Classification Search
None
See application file for complete search history.

(56) References Cited

U.S. PATENT DOCUMENTS 6,528,788 B1    3/2003    Galloway
6,791,610 B1    9/2004    Butler et al.
(Continued)

FOREIGN PATENT DOCUMENTS

CN    102798473    11/2012
EP    2704060 A2    3/2014

OTHER PUBLICATIONS

Berger, M. et al. "Room Occupancy Measurement Using Low-Resolution Infrared Cameras", IET Irish Signals and Systems Conference, Jan. 1, 2010, Retrieved from the Internet: Mar. 16, 2017, URL: http://ieeexplore.ieee.org/ielx5/5618870/5638401/05638411.pdf, 6 pages.
(Continued)

*Primary Examiner* — Wei Wen Yang
(74) *Attorney, Agent, or Firm* — Cantor Colburn LLP

(57) ABSTRACT

A method of operating an object detection and tracking system includes the step of estimating (202) a current background of a current frame of sensor data generated by a sensor based on a previous frame of sensor data by a computer-based processor. The method further includes estimating (204) a foreground of the current frame of sensor data by comparing the current frame of sensor data to the current background, and detecting (212) an object using a sensor-specific object model.

5 Claims, 8 Drawing Sheets

(52) U.S. Cl.
CPC ............... *G06T 2207/20024* (2013.01); *G06T 2207/20076* (2013.01); *G06T 2207/20081* (2013.01); *G06T 2207/30232* (2013.01)

(56) References Cited

U.S. PATENT DOCUMENTS

| | | | |
|---|---|---|---|
| 6,992,291 | B2 | 1/2006 | Porter et al. |
| 7,110,035 | B1 | 9/2006 | Hellstrand |
| 7,148,913 | B2 | 12/2006 | Keaton et al. |
| 7,447,334 | B1 | 11/2008 | Jiang |
| 7,791,026 | B2 | 9/2010 | Liddiard |
| 7,807,010 | B2 | 10/2010 | Pitault |
| 7,813,528 | B2 | 10/2010 | Porikli et al. |
| 7,842,922 | B2 | 11/2010 | Leneke et al. |
| 8,200,046 | B2 | 6/2012 | Cloud et al. |
| 8,615,420 | B2 | 12/2013 | Holliday |
| 8,705,793 | B2 | 4/2014 | Nevatia et al. |
| 8,731,241 | B2 | 5/2014 | Johnson et al. |
| 8,892,392 | B2 | 11/2014 | Perala et al. |
| 9,070,012 | B1* | 6/2015 | Sieracki ............... G06K 9/4633 |
| 2003/0040815 | A1 | 2/2003 | Pavlidis |
| 2008/0292196 | A1 | 11/2008 | Jain |
| 2009/0290762 | A1 | 11/2009 | Guan |
| 2011/0295583 | A1 | 12/2011 | Hollock |
| 2012/0308124 | A1 | 12/2012 | Belhumeur |
| 2013/0135444 | A1 | 5/2013 | Stein et al. |
| 2014/0139660 | A1 | 5/2014 | Zhu |
| 2014/0254863 | A1* | 9/2014 | Marks ..................... G06T 7/194 382/103 |
| 2014/0285672 | A1 | 9/2014 | Högasten |
| 2014/0347475 | A1* | 11/2014 | Divakaran ......... G06K 9/00771 348/135 |
| 2014/0355829 | A1 | 12/2014 | Heu |
| 2015/0170374 | A1 | 6/2015 | Chang |
| 2015/0220488 | A1* | 8/2015 | Healy ..................... G01S 13/84 702/181 |
| 2017/0363465 | A1* | 12/2017 | Send ....................... G01S 11/12 |

OTHER PUBLICATIONS

Chen, Z. et al. "Bayesian Filtering: From KAlman Filters to Particle Filters, and Beyond", Jan. 1, 2003, Retrieved from the Internet Jan. 18, 2016, URL: http://www.dsi.unifi.it/users/chisi/idfric/Nonlinear_filtering_Chen.pdf, 69 pages.

International Search Report from the International Searching Authority for International Application No. PCT/US2017/014016; Date of Completion: Mar. 22, 2017; dated May 29, 2017; 8 Pages.

Isgard, M. et al. "BraMble: a bayesian multiple-blob tracker", Proceedings of the Eight IEEE International Conference on Computer Vision, Vancouver, British Columbia, Canada, Jul. 7-14, 2001, 8 pages.

Moradiannejad, G. "People Tracking Under Occlusion Using Gaussian Moxture Model and Fast Level Set Energy Minimization", Masters of Applied Science in Electrical and Computer Engineering University of Ottawa, Apr. 2013, 100 Pages.

Paul, M. et al. "Human detection in surveillance videos and its application—a review", EURASIP Journal on Advances in Signal Processing 2013, 2013:176, 16 pages.

Pineiro Ave, J. et al. "Kalman filtering for drift correction in IR detectors", Proceedings of the 5th WSEAS Int. Conf. on Signal Processing, Robotics and Automation, Madrid, Spain, Feb. 15-17, 2006, pp. 258-263.

Thierry Bouwmans, Fida El Baf, Bertrand Vachon. Background Modeling using Mixture of Gaussians for Foreground Detection—A Survey. Recent Patents on Computer Science, Bentham Science Publishers, 2008, 1 (3), pp. 219-237.

Tracking Subpixel Targets with Critically Sampled Optical Sensors by James T. Lotspeich, Sep. 2012, Naval Postgraduate School, Monterey, California, 93 Pages.

Wang, X. et al. "Foreground Object Detecting Algorithm based on Mixture of Gaussian and Kalman Filter in Video Surveillance", Journal of Computers, vol. 8, No. 3, Mar. 2013, pp. 693-700.

Written Opinion from the International Searching Authority for International Application No. PCT/US2017/014016; International Filing Date: Jan. 19, 2017; dated May 29, 2017; 10 Pages.

Dalal, N et al. "Histograms of Oriented Gradients for Human Detection", IEEE Conference on Computer Vision and Pattern Recognition, 2005, 8 Pages.

Felzenszwalb, P. et al. "Object Detection with Discriminatively Trained Part Based Models", IEEE Transactions on Pattern Analysis and Machine Intelligence, vol. 32, No. 9, Sep. 2010, 20 Pages.

Mas, D et al. "Resolution limits to object tracking with subpixel accuracy", Optics Letters, vol. 37, No. 23, Dec. 1, 2012, 4 Pages.

Communication from the European Patent Office for European Application No. 17705506.8; dated Mar. 17, 2021; 10 Pages.

Kim, H et al. "Resident Location-Recognition Algorithm Using a Bayesian Classifier in the PIR Sensor-based Indoor Location-Aware System", IEEE Transactions on Systems, Man and Cybernetics—Part C: Applications and Reviews, vol. 39, No. 2, Mar. 2009, pp. 240-245.

\* cited by examiner

BUILDING MANAGEMENT SYSTEM USING OBJECT DETECTION AND TRACKING IN A LARGE SPACE WITH A LOW RESOLUTION SENSOR

CROSS REFERENCE TO RELATED APPLICATIONS

This application is a National Stage application of PCT/US2017/014016, filed Jan. 19, 2017, which claims the benefit of U.S. Provisional Application No. 62/280,942, filed Jan. 20, 2016, both of which are incorporated by reference in their entirety herein.

BACKGROUND

The present disclosure relates to building management systems, and more particularly, to object detection and tracking in a large area using a low resolution sensor.

Infrared detectors used for intrusion and presence detection are typically limited to pixel counts of about four-by-four (4×4) elements to stay reasonable in terms of cost and performance. Even with advances in MEMS, the pixel counts remain less than approximately one hundred-by-one hundred (100×100). The manufacturing process for these low cost detectors does not scale well in terms of cost as pixel count increases. Additionally, the physical size of an infrared focal plane array is large compared to the same pixel count for, as one example, complementary metal oxide silicon (CMOS) visible sensors because of the longer wavelength. As such, one-by-one (1×1) to four-by-four (4×4) pyroelectric elements are commonplace as, for example, occupancy detectors, but even in sizes up to approximately one hundred-by-one hundred (100×100) they are not able to count with the fidelity needed to achieve more efficiently controlled heating, ventilation, and air conditioning (HVAC) systems and lighting. Yet further, energy consumption of infrared focal plane arrays becomes larger than desired for arrays having sufficient pixels to meet fidelity needs when supporting other systems such as HVAC and lighting.

Typical state-of-the-art presence detection may use a two-element passive infrared (PR) sensor. These sensors typically include faceted lens designs and may include masks and variable detection thresholds to achieve useable performance. Unfortunately, such PIR sensors may have difficulty in distinguishing people from other heat sources (e.g., animals, HVAC operation, etc.), may not be able to localize or track the detected object, and may not be able to count the number of objects.

Typical state-of-the-art algorithms for people detection, classification, tracking and counting have been developed in the field of computer vision. For instance, there are state-of-the-art object detection algorithms for people detection and tracking including Support Vector Machines (SVM) on Histogram of Oriented Gradient (HOG) features, and discriminatively trained Deformable Part Models (DPM). Unfortunately, these algorithms are designed to work on visible spectrum, multi-color video with many hundreds or thousands of pixels on target. It is desirable to design detector systems and associated algorithms for infrared video and/or video with relatively few pixels on target (i.e., tens to a few hundreds of pixels). It is further desirable to develop cost effective detector systems and methods that perform occupancy detection and people counting with improved fidelity and reduced energy consumption to, for example, support HVAC and lighting systems.

SUMMARY

A method of operating an object detection and tracking system according to one, non-limiting, embodiment of the present disclosure includes estimating a current background of a current frame of sensor data generated by a sensor and based on a previous frame of sensor data by a computer-based processor; estimating a foreground of the current frame of sensor data by comparing the current frame of sensor data to the current background; and detecting an object using a sensor-specific object model.

Additionally to the foregoing embodiment, the sensor is an absolute intensity sensor utilizing a chopper.

In the alternative or additionally thereto, in the foregoing embodiment, the method includes tracking the object via a Bayesian Estimator, and wherein the sensor-specific object model is a chopped-data object model.

In the alternative or additionally thereto, in the foregoing embodiment, the chopped-data object model is a Gaussian Mixture object model.

In the alternative or additionally thereto, in the foregoing embodiment, the chopped-data object model is parameterized at least in-part by perspective data.

In the alternative or additionally thereto, in the foregoing embodiment, the chopped-data object model is learned by discriminative dictionary learning.

In the alternative or additionally thereto, in the foregoing embodiment, the Bayesian Estimator is a Kalman Filter.

In the alternative or additionally thereto, in the foregoing embodiment, the Bayesian Estimator is a Particle Filter.

In the alternative or additionally thereto, in the foregoing embodiment, the sensor is a relative intensity sensor that does not utilize a chopper.

In the alternative or additionally thereto, in the foregoing embodiment, the method includes tracking the object utilizing a Bayesian Estimator, and wherein the object is detected via a sensor-specific object model and a ghost filter to compensate for characteristics of un-chopped imagery.

In the alternative or additionally thereto, in the foregoing embodiment, the ghost filter is an iterative joint estimation process.

In the alternative or additionally thereto, in the foregoing embodiment, the ghost filter is a space adaptive shape suppression process.

In the alternative or additionally thereto, in the foregoing embodiment, the Bayesian Estimator is a Kalman Filter.

In the alternative or additionally thereto, in the foregoing embodiment, the Bayesian Estimator is a Particle Filter.

In the alternative or additionally thereto, in the foregoing embodiment, the sensor-specific object model utilizes a designed basis.

In the alternative or additionally thereto, in the foregoing embodiment, the designed basis comprises one of a Harr basis and a Gabor basis.

In the alternative or additionally thereto, in the foregoing embodiment, the designed basis is over-complete.

The foregoing features and elements may be combined in various combinations without exclusivity, unless expressly indicated otherwise. These features and elements as well as the operation thereof will become more apparent in light of the following description and the accompanying drawings.

However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
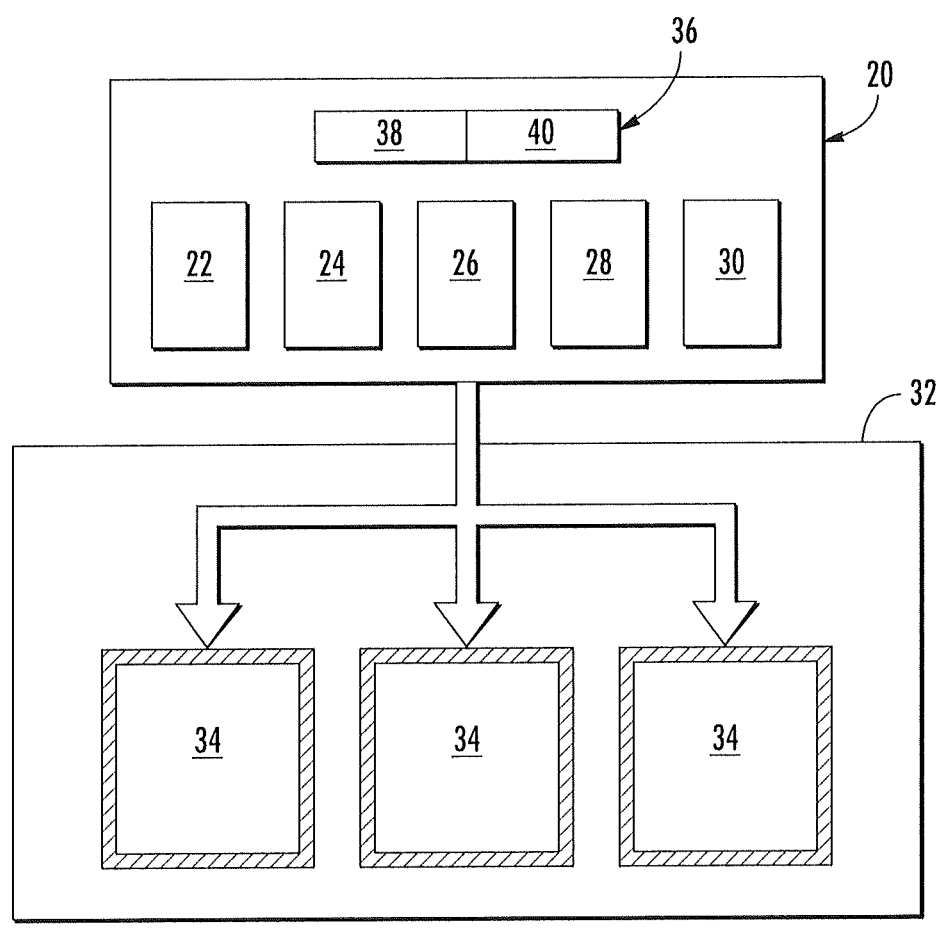
FIG. 1 is a schematic of a building management system utilizing an object detection and tracking (ODT) system of the present disclosure.

Referring to FIG. 1, a building management system 20 of the present disclosure is illustrated. The building management system 20 may include at least one of an ambient air temperature control system 22, a security system 24, a lighting or illumination system 26, a transportation system 28, a safety system 30 and others. Each system 22, 24, 26, 28, 30 may be associated with and/or contained within a building 32 having a plurality of predefined spaces 34 that may generally be detached or substantially isolated from one-another, may be accessible and/or interconnected via a door and/or through hallways (not shown) and other means.

The ambient air temperature control system 22 may be a forced air system such as a heating, ventilation, and air conditioning (HVAC) system, a radiant heat system, and others. The security system 24 may be configured to detect intruders and provide various forms of alerts and notifications. The lighting system 26 may control and/or monitor lighting in each one of the predefined spaces 34 based on any number of factors including natural background lighting, occupancy, and others. The transportation system 28 may include the control and/or monitoring of elevators, escalators, and other transportation devices associated with and/or within the building 32. The safety system 30 may include the detection of conditions that may pose a risk or health hazard to occupants of the building 32. All of these systems 22, 24, 26, 28, 30 may require a variety of devices to perform any variety of functions including detection, monitoring, communication, data referencing and collection, user control, and others. Many devices may be shared between systems.

The building management system 20 may further include a computing device 36 that controls and/or supports each system 22, 24, 26, 28, 30. The computing device 36 may include a processor 38 (e.g., microprocessor) and a computer readable and writeable storage medium 40. It is further contemplated and understood that the building management system 20 may include more than one computing device 36 with any one computing device being dedicated to any one of the systems 22, 24, 26, 28, 30.

Figure 2:
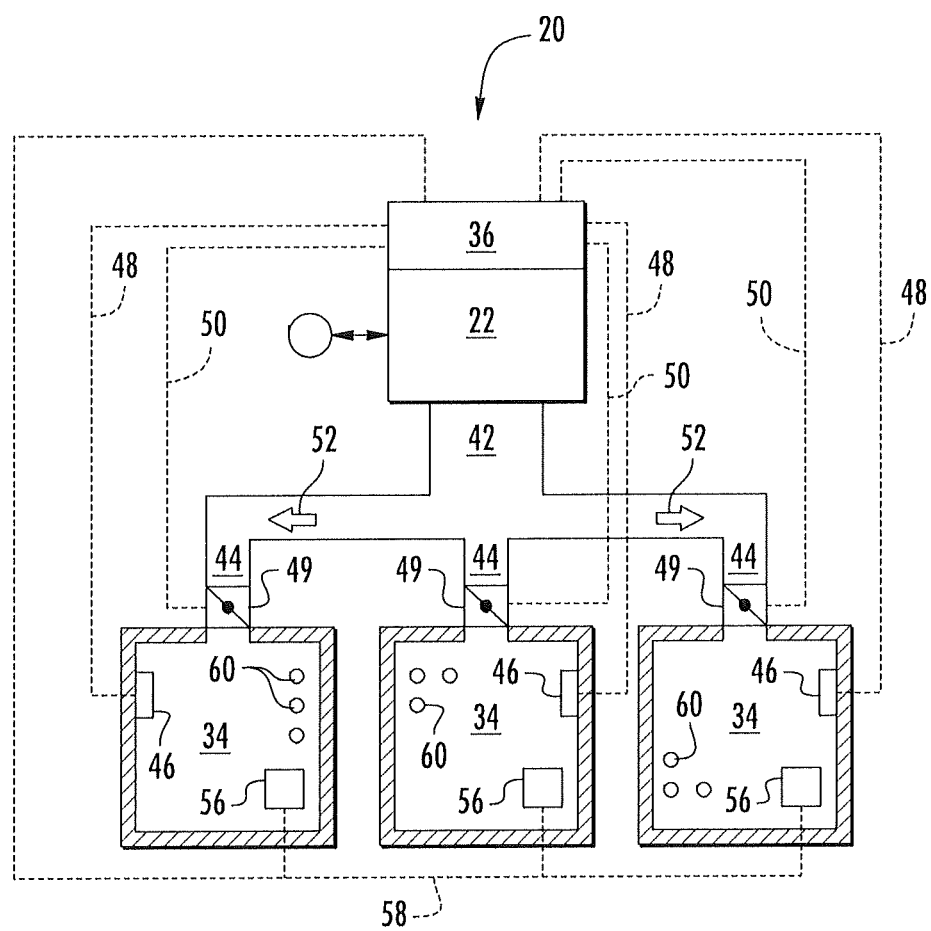
FIG. 2 is a schematic of one embodiment of the building management system having an ambient air temperature control system utilizing the ODT system.

Referring to FIGS. 1 and 2, in one embodiment, the HVAC system 22 of the building management system 20 may include a common supply duct plenum 42 that flows heated or cooled air into a plurality of ducts 44 routed to respective spaces 34 of the building 32. A temperature thermostat 46 may be located in each space 34 for controlling and monitoring ambient air temperature. In operation, the thermostat 46 may send a signal over pathway 48 to the computing device 36 when a demand for heating and/or cooling is needed. In-turn, the computing device 36 may initiate the HVAC system 22 that may include the control and/or energization of a 49 located in each duct 44. The control and/or energization of the dampers 49 is conducted over pathways 50, and enables the controlled flow of heated or cooled air (see arrows 52) from the supply plenum 42 and into the respective spaces 34.

Figure 3:
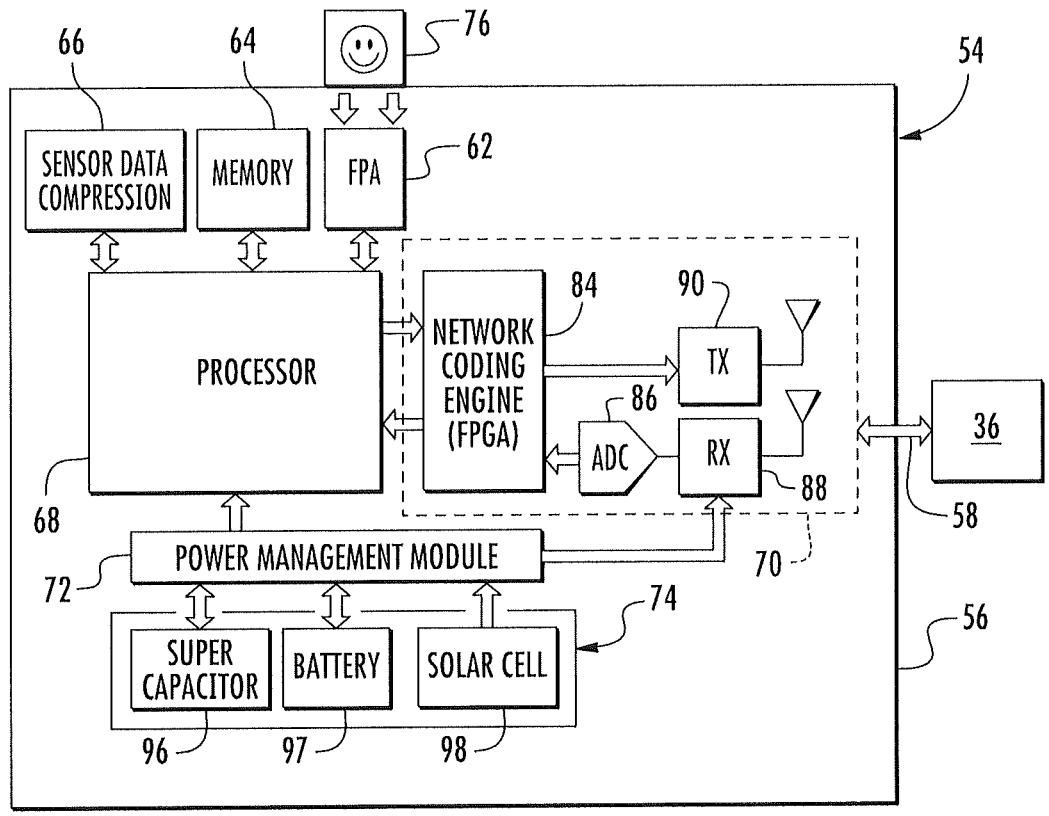
FIG. 3 is a schematic of the ODT system.

Referring to FIGS. 2 and 3, the building management system 20 includes an object detection and tracking (ODT) system 54. The ODT system 54 may utilize low cost and low resolution sensors and associated computer vision algorithms to accurately detect, classify, track and count objects (e.g., people) in a given space using minimal energy consumption; and in one embodiment, enabling functions of the building management system 20 (e.g., HVAC system 22, lighting system 26, security system 24 and others). For example, the computing device 36 may receive a signal from the ODT system 54 indicative of no persons in a given space 34. Upon such a signal, the computing device 36 may output a command signal to the HVAC system 22 to, for example, lower a temperature set-point, and/or send a signal to the lighting system 26 to turn off the lights in the given space 34. As another example, the computing device 36 may receive a signal from the ODT system 54 indicative of a person entering or in the space 34. Upon such a signal, the computing device 36 may output a signal to the security system 24 indicative of an intrusion whereupon an alarm may be initiated.

The ODT system 54 may include a plurality of local units 56 with at least one local unit located in at least one space 34. The local units 56 may be configured to communicate with the computing device 36 over wired or wireless pathways (see arrow 58). Each local unit 56 is configured to monitor a pre-scribed scene 76 in its associated space 34 (e.g., the entire space or a particular restricted Field of View (FOV)) for detection, classification, tracking and counting of objects 60. An example of an object 60 may be a human or may be anything that emits heat. The local unit 56 may include a sensor 62 that may be low resolution, a memory module 64, a sensor data compression block 66, a processor 68, a communication module 70, a power management module 72, and a power source 74.

Figure 4:
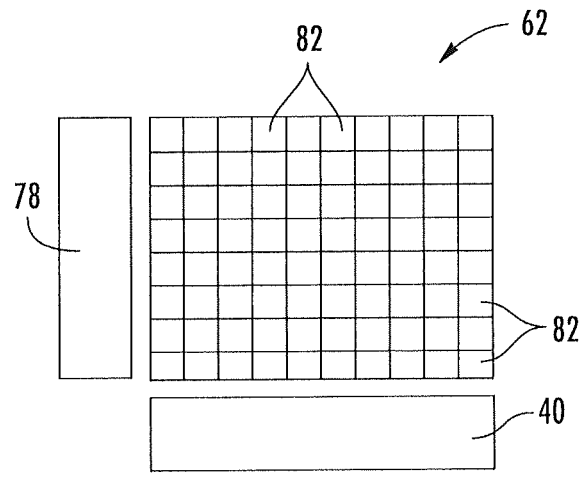
FIG. 4 is a plan view of a focal plan array of a remote unit of the ODT system.

Referring to FIGS. 3 and 4, the low resolution sensor 62 may be an infrared focal plane array (FPA) configured to sense and detect radiated heat emitted by the objects 60 (e.g., a human). The FPA 62 is 'low resolution' because it may include less than one thousand pixels and preferably ten to three hundred pixels. The space 34 is a 'large' space relative to the low resolution FPA 62 (i.e., relatively low number of pixels per unit area). The FPA 62 may include a row decoder 78, a column decoder 80 (which are part of the Read-Out Integrated Circuit (ROIC)), and the plurality of pixels 82 that may be infrared sensors arranged in a series of rows and columns (i.e., six rows and nine columns illustrated in FIG. 4). The row and column decoders 78, 80 are electrically coupled to the respective rows and columns of the pixels 82, and are configured to receive intensity information (e.g., heat intensity) recorded over a time interval. As one example, the pixels 82 may be configured to sense radiated energy having an infrared, long wavelength that may be within a range of about three (3) to fifteen (15) micrometers. This range is a thermal imaging region, in which the pixels 82 may obtain a passive image of the objects 60 that are in whole or in part at only a slightly higher temperature than, for example, room temperature. This image may be based on thermal emissions only and may require no visible illumination.

The memory module 64 of the local unit 56 is generally a computer readable and writeable storage medium and is configured to communicate with the processor 68 and generally stores intensity data from the sensors 82 for later processing, stores executable programs (e.g., algorithms) and their associated permanent data as well as intermediate data from their computation. The memory module 64 may be a random-access memory (RAM) that may be a ferro-electric RAM (FRAM) having relatively low power consumption with relatively fast write performance, and a high number of write-erase cycles. It is further contemplated and understood that the ODT system 54 may be integrated in-part with the computing device 36 that may also perform, at least in-part, a portion of the data processing of data received from the FPA 62.

The radiant energy intensity information/data received by the decoders 78, 80 may be conditioned via a signal conditioning circuit (not shown) and then sent to the processor 68. The signal conditioning circuit may be part of the ROIC. Signal conditioning may include analog-to-digital converters and other circuitry to compensate for noise that may be introduced by the sensors 82. The processor 68 may be configured to provide focal plane scaling of the intensity value data received from the signal condition circuit and may further provide interpolation techniques generally known in the art. The processor 68 is generally computer-based and examples may include a post-processor, a microprocessor and/or a digital signal processor.

The sensor data compression block 66 of the local unit 56 is known to one having skill in the art and is generally optional with regard to the present disclosure.

The communication module 70 of the local unit 56 is configured to send and receive information and commands relative to the operation of the remote unit 56. The communication module 70 may include a network coding engine block 84, an analog to digital converter (ADC) 86, a receiver 88 (e.g. wireless), and a transmitter 90 (e.g., wireless). As is well-known in the art, the transmitter 90 and receiver 88 may be implemented as a transceiver or could be replaced by a well-known wired communication link (not shown). Equally as is well known in the art, transmitter 90 performs digital to analog conversion (DAC) when the communication channel is inherently analog (e.g., wireless). The network coding engine block 84 is configured to interface the input and output of the processor 68 to transmitter 90, receiver 88 (through ADC 86), provide encoding (e.g., for error detection and correction), security via encryption or authentication, and other features.

The ADC 86 of the local unit 56 is configured to convert received analog information to digital information for eventual use by the processor 68. The network coding engine 84 provides any decoding necessary for error detection and correction, and/or security.

The receiver 88 and the transmitter 90 of the local unit 56 are configured to respectively receive and transmit communications to and from other systems or components such as the computing device 36 of the building management system 20 and/or the HVAC system 22. Such communications may be conducted over pathways that may be wired or wireless.

The power management module 72 of the local unit 56 is configured to control the power acquisition and power consumption of the remote unit 56 by controlling both the power source 74 and power consuming components. Such power consuming components may include the processor 68, the optional data compression block 66, the memory 64, the FPA 62 and the communication module 70 (e.g., transmitter 90, receiver 88, and ADC 86). It is contemplated and understood that other energy consuming components of the remote unit 56 may be controlled. Such control may simultaneously maintain the remote unit 56 functionality while maximizing life (i.e., the length of time the remote unit 56 can remain functional). In one embodiment, this control is achieved by receding horizon control (optimization). In alternative embodiments other control strategies such as model predictive control may be used. In one embodiment, the power consumption of processor 68 and memory 64 may be controlled by the power management module 72 by reducing the clock rate.

The power source 74 of the local unit 56 provides power to the other components of the unit, and may include at least one of a super capacitor 96, a battery 97 and a solar cell 98. The power management module 72 is configured to draw power from any one of the power sources as dictated by the needs of the system. The power management module 72 may also facilitate a power scheduling function that controls the simultaneous use of the various on-chip component functions to minimize unwanted current spikes. It is contemplated and understood that other short-term energy storage devices may be used in place of the super capacitor 96, other long-term energy storage devices may be used in place of the battery 97, and other energy harvesting or recharging devices may be used in place of the solar cell 98 including power from a power grid.

Figure 5:
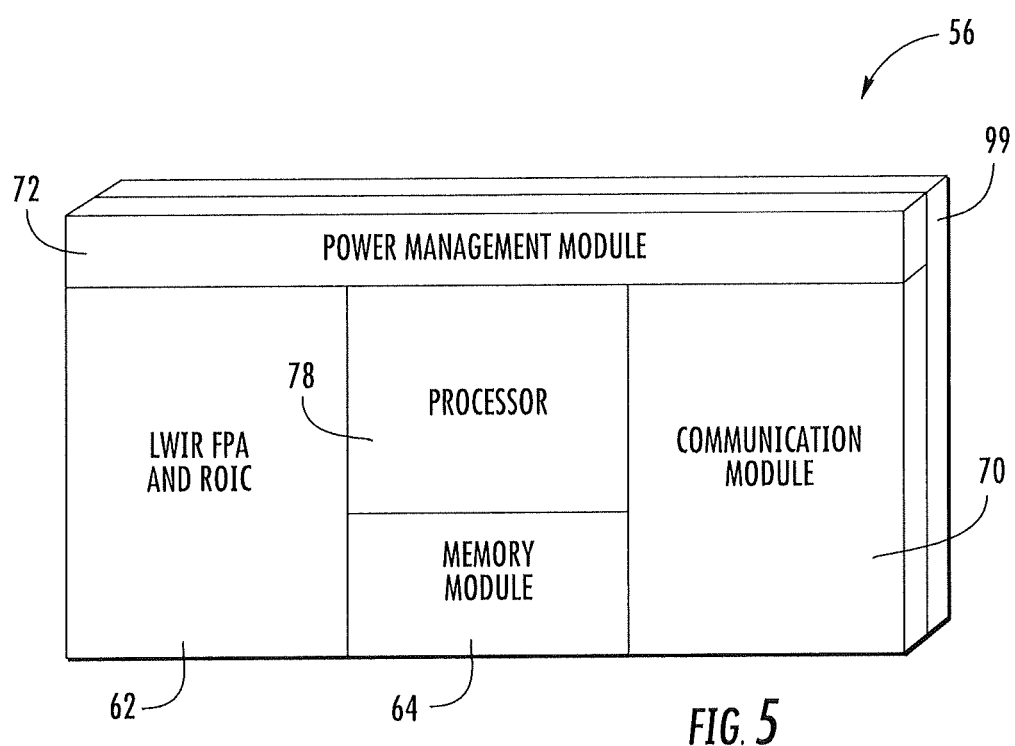
FIG. 5 is a perspective view of components of the remote unit integrated into a common substrate platform.

Referring to FIG. 5, the FPA 62 (including the ROIC), the memory module 64, the processor 68, the power management module 72 and the communication module 70 may generally be integrated together on a single substrate platform or chip 99 that may be silicon-based. More specifically, the components may generally share the focal plane of the FPA 62. Together, the integrated components may be aimed toward minimal power consumption, small overall size/weight and low cost. Integration of these components may be further enhanced via a power scheduling function conducted by the power management module 72 as well as coordinated design of the individual functions of each component to work harmoniously. That is, the power scheduling function may, for example, minimize unwanted current spikes by controlling the simultaneous use of the various on-chip components functions.

By placing individual subsystem components on the same die or substrate platform 99, signal integrity, resistive losses and security is generally improved through elimination of interconnects and sources of extraneous electrical and radiative noise typically present in systems with similar functionality but that use several individually packaged integrated circuits (IC's). Moreover, by placing all components on the same substrate platform 99, economy of scale is achieved that enables chip-scale cost reduction. Yet further, power management and consumption may be optimized potentially achieving long life battery operation, and facilitating packaging of various circuitry components on a single substrate platform 99. The detector unit 56 may be built upon a ferroelectric memory platform using either active or passive detection; and, may be built upon a thermal isolator rather than a MEMS bridge, thereby improving yield, reducing across device response variations, and may be compatible with wafer production having small feature sizes.

Absolute Intensity (Chopped) and Relative Intensity (Un-Chopped) Sensors

The infrared FPA 62 may function via absolute intensity (i.e., chopped) or relative intensity (i.e., un-chopped). In an absolute intensity sensor, an additional device known as a chopper (also called a rotating shutter), provides a reference constant-temperature image source and the difference from this reference view is the image provided to the user. Conversely, in a relative intensity sensor there is no chopper and only intensity differences from the previous image are provided. The key characteristic of these relative intensity images is that an object disappears if it does not move, because there is no temperature difference at a given pixel location from the previous image.

Figure 8:
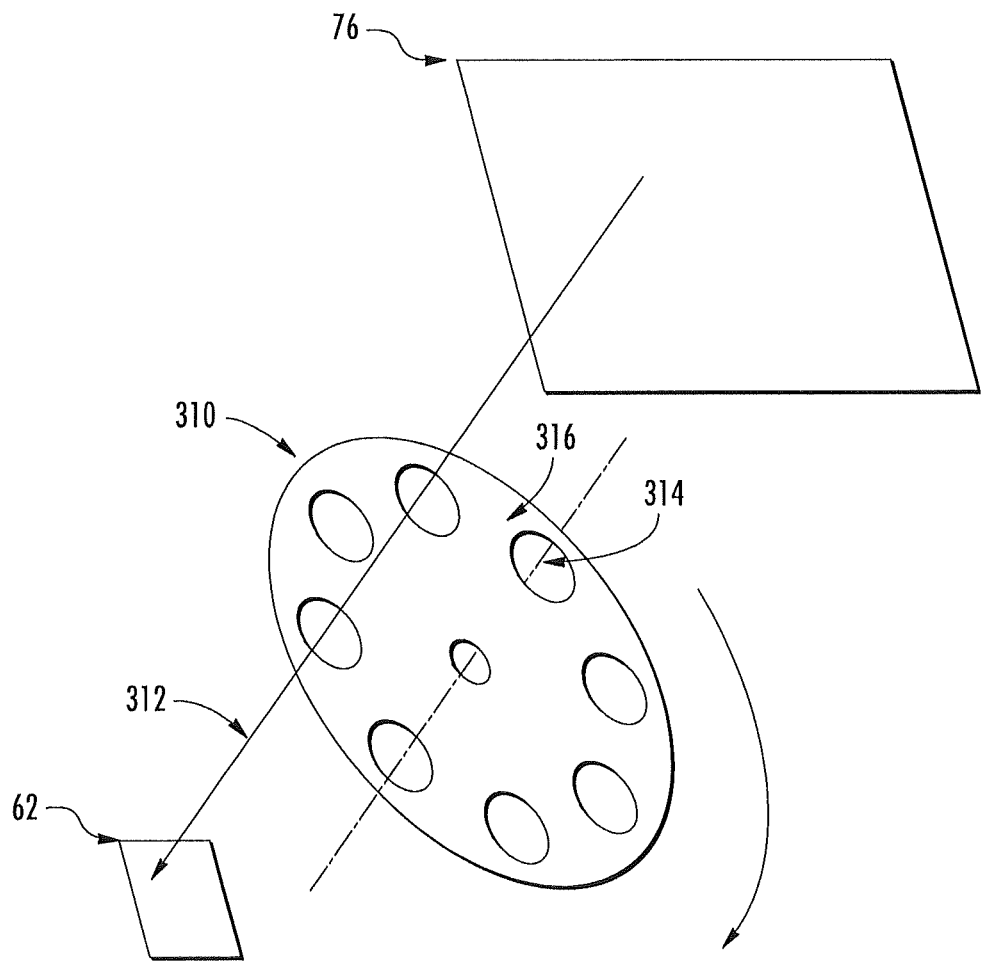
FIG. 8 is a diagram of a rotating wheel chopper detector which provides an absolute intensity image.

Referring now to FIGS. 3 and 8, a chopper 310 may be interposed between the low resolution sensor 62 and the scene 76 so as to interrupt electromagnetic radiation (see arrow 312) emanating from the scene 76 from reaching the low resolution sensor 62. Chopper 310 may be any of a variety of types such as, for example, a rotating wheel with alternating transmissive areas 314 and non-transmissive areas 316. The rotation of the chopper 310 is coordinated with the acquisition of images by the low resolution sensor 62 such that an image is acquired only when one of the transmissive areas 314 or non-transmissive areas 316 is fully in front of low resolution sensor 62. When non-transmissive area 316 blocks electromagnetic radiation 312, the low resolution sensor 62 receives a background amount of radiation from the chopper 310. When transmissive area 314 passes electromagnetic radiation 312, the low resolution sensor 62 receives radiation from scene 76. Since low resolution sensor 62 is sensitive only to differences in received radiation, the entire scene 76, both stationary and moving objects, will create signals on the pixels 82.

Figure 9:
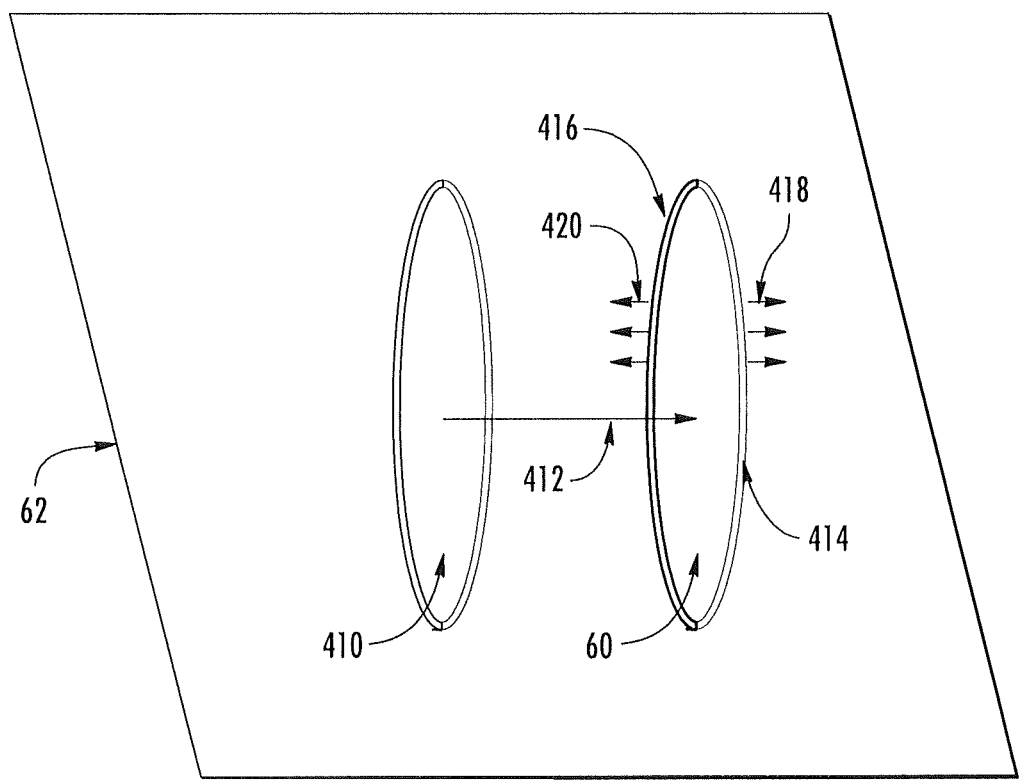
FIG. 9 is a diagram of imagery from an un-chopped detector depicting one possible spurious artefact.

Referring now to FIG. 9, a spurious artefact of certain sensors, called a 'ghost' image, will be explained. These sensors, such as some un-chopped infrared focal plane arrays, have characteristic response times wherein the signal recorded by given pixel 82 for a change in electromagnetic radiation intensity 312 rises or falls from a previous value to a new final value. If this characteristic response time is longer than the time between successive frames, a residual signal may still be sensed since the pixel 82 has not yet reached its final value. For instance, when object 60 (i.e., assumed to be at a constant temperature above ambient and the only moving object in the field of view) moves within the view of low resolution sensor 62 from a former location 410 in the direction and magnitude of motion 412, low resolution sensor 62 will generate a new image of the object 60 with a leading edge 414 where the apparent temperature is higher than previously and a trailing edge 416 where the apparent temperature is lower than previously. In the image from low resolution sensor 62, the leading edge will have strong intensity gradients 418 and trailing edge 416 will have strong intensity gradients 420. The leading edge 414 with associated gradients 418 and the trailing edge 416 with associated gradients 412 may also be residually present in the image at prior location 410 if the pixels 82 have not yet reached their final values. The locations where the pixels have not reached their final values comprise a 'ghost' image.

The strong intensity gradients 418 and 420 of un-chopped infrared video are exploited as a sensor-specific object model by working in a wavelet transform domain that uses basis functions with strong positive/negative coefficients (e.g., a Haar or Gabor basis). These basis functions may be over-complete, particularly in rotation angle, to achieve a more sparse, discriminative model. Additionally, a novel 'ghost' filter may be used following (or iteratively with) the detection and tracking. The ghost image may be removed by executing the tracking and 'ghost' filtering in an iterative manner (i.e., the track estimate is used to predict magnitude and location of the 'ghost' since the 'ghost' depends on where the hot object was). The 'ghost' is estimated as best magnitude-scaled replica of the current object at the previous location. The estimated 'ghost' is subtracted, the detection is updated based on the transformed features without the 'ghost', and the track is updated based on the updated detection. This process iterates until convergence. This approach may be thought of as spatial adaptive shape suppression (SASS) in analogy to acoustic echo cancellation (AEC). In AEC, magnitude-scaled and time-shifted replicas (echos) of a 1-D signal are subtracted from future signals. In SASS, magnitude-scaled and space-shifted replicas of a 2-D signal are subtracted from the current image.

Object Tracking in Large Areas Using Small Absolute Intensity FPAs

In one embodiment of the ODT system 54, the system may utilize advanced machine vision techniques to exploit both spatial and temporal relationships of small objects 60 (i.e., up to a few hundred pixels 82 on an object 60) in low-cost, absolute intensity, infrared video from a small FPA 82 (e.g., 16×16, 64×64 pixels, etc.). Two approaches in tracking objects that subtend a small number of pixels in low-resolution video are described. The first approach entails using a sensor-specific object model comprising fitting non-normalized Mixture of Gaussian (MOG) distributions and Kalman Filter tracking of the distributions' means at sub-pixel resolution. The omission of normalization conserves the magnitude of the infrared radiation. While matched filtering with more sophisticated object models is known, the low number of pixels on the object 60 and the variation of the object shape (e.g., two-dimensional projection of people movement) may not support the use of sophisticated object models. In the second approach, a sparse dictionary learning approach is used for detection, where the magnitude of the sparse coefficient and location of the object (according to labels associated with the dictionary atoms) are used in tracking filter state vector. In alternative embodiments, other Bayesian Filters may be used for tracking such as a Particle Filter. The magnitude of non-normalized MOG estimate may be included in the state vector to help disambiguate tracks of objects and allow estimation of the count of the number of objects 60 (e.g., people).

The Mixture of Gaussian algorithm may be a fast, incremental algorithm that has a complexity of $O(m*p*f)$ where 'm' is the number of Gaussian distributions (i.e., number of people in the scene at any one time), 'p' is the number of pixels, and 'f' is the update frequency. The Kalman filter has a known complexity of $O(p^3*f)$ where again 'p' is the number of pixels and 'f' is the update frequency.

Method of Operating an Absolute Intensity Sensor

Figure 6:
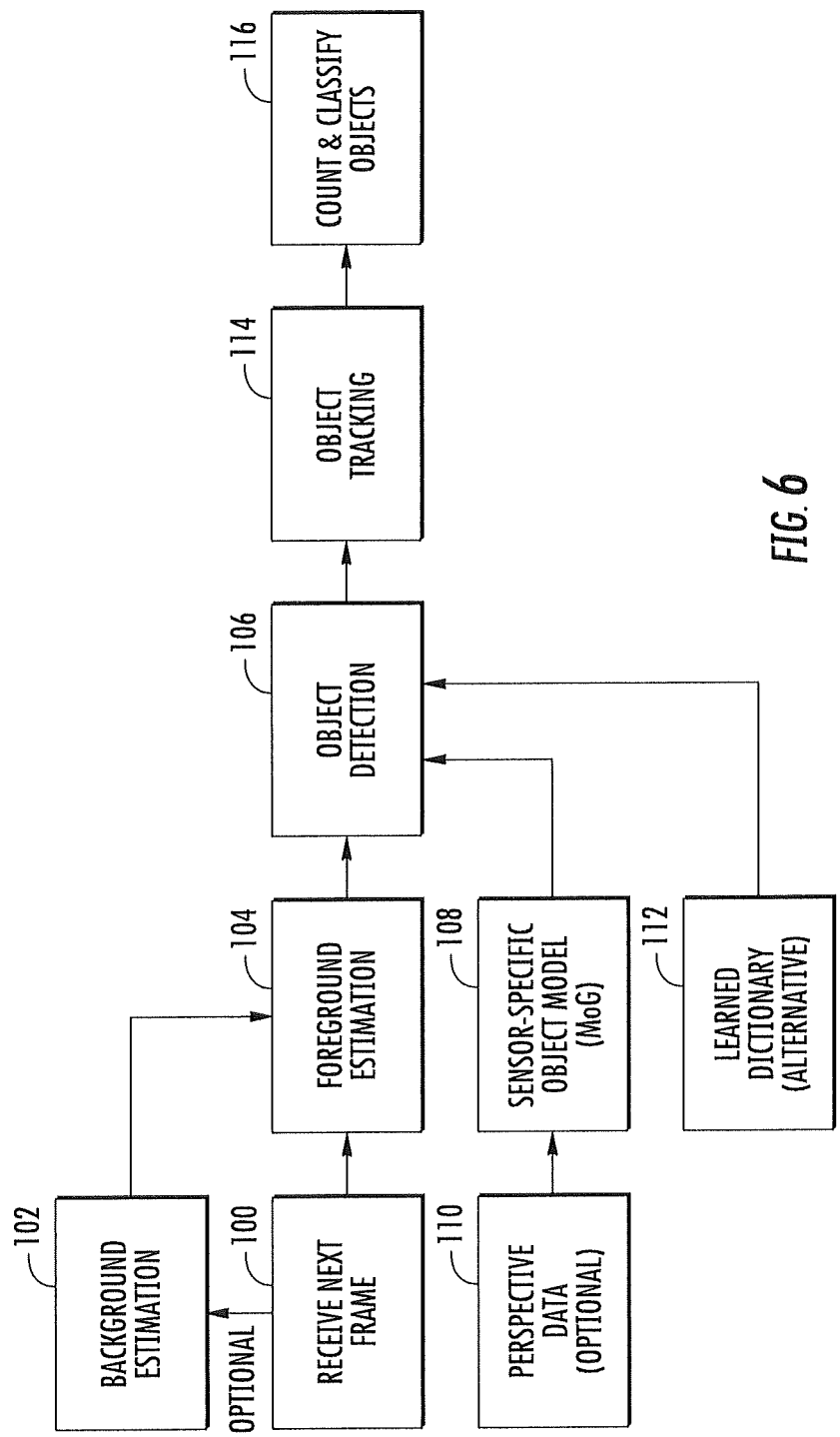
FIG. 6 is a flow chart of a method of operating a first embodiment of the ODT system utilizing an absolute intensity (chopped) array sensor.

Referring to FIG. 6, one example of a method of operating the ODT system 54 includes, as block 100, receiving the next frame of data from a sensor. The sensor may be a one-dimensional or a two-dimensional array sensor sensing either a projection of a three-dimensional scene or sensing the distance to a point in the scene (i.e., a depth sensor). The sensed phenomena may be electromagnetic at any frequency or acoustic at any frequency. The frame may be received at a periodic rate, on demand from the "Receive Next Frame" function, or at any scheduled, pseudo random, or random rate. Specifically in the case of a depth sensor, the sensor may be a structured light measurement, phase shift measurement, time of flight measurement, stereo triangulation device, light field camera, coded aperture camera, computational imaging technique camera (structure from motion, simultaneous localization and mapping, depth from defocus, etc.), imaging radar, imaging sonar, scanning LIDAR, Flash LIDAR, or similar technology. In the preferred embodiment for presence detection, the sensor is a two-dimensional infrared FPA.

As block 102, a static or a dynamic background is estimated. The background estimate may be performed a priori and may be non-adaptive (e.g., a codebook model). Alternatively, the background estimate may be updated based on the current frame using, for example, a Mixture of Gaussians approach. Other approaches as are well-known in the art may also be used.

As block 104, foreground objects are estimated by comparing the received frame to the background estimate. This step may optionally include various morphological operations (not shown) to, for example, filter noise.

As block 106, an object is detected. Unique to the detection of small objects in low-resolution chopped data is the use of a sensor-specific (chopped-data) object model, which may be a Gaussian Mixture Model (GMM), see block 108. In an alternate embodiment the object model may be a saturated GMM where the highest values are truncated to a threshold. The object model may be parameterized in part or in total by perspective data (see block 110) (e.g., the variance of the distribution may vary by the geometry of the scene (i.e., nearer objects are larger). In another embodiment, an empirical object model may be employed where the object model is learned, preferably by discriminative dictionary learning, from training data (see block 112). The detection itself comprises computing the parameters of the object model and inferring from those parameters the number and location of the objects to sub-pixel accuracy. The mean of each object two-dimensional Gaussian distribution may be the location.

As block 114, the objects, once detected, are tracked, preferably using a Kalman Filter. In one embodiment, a Bayesian Estimator as one type of Kalman Filter is employed. In another embodiment, a Particle Filter as another type of Bayesian Estimator, is employed.

As block 116, the detected objects may be counted and classified by any well-known technique.

Method of Operating a Relative Intensity (un-chopped) Sensor

Figure 7:
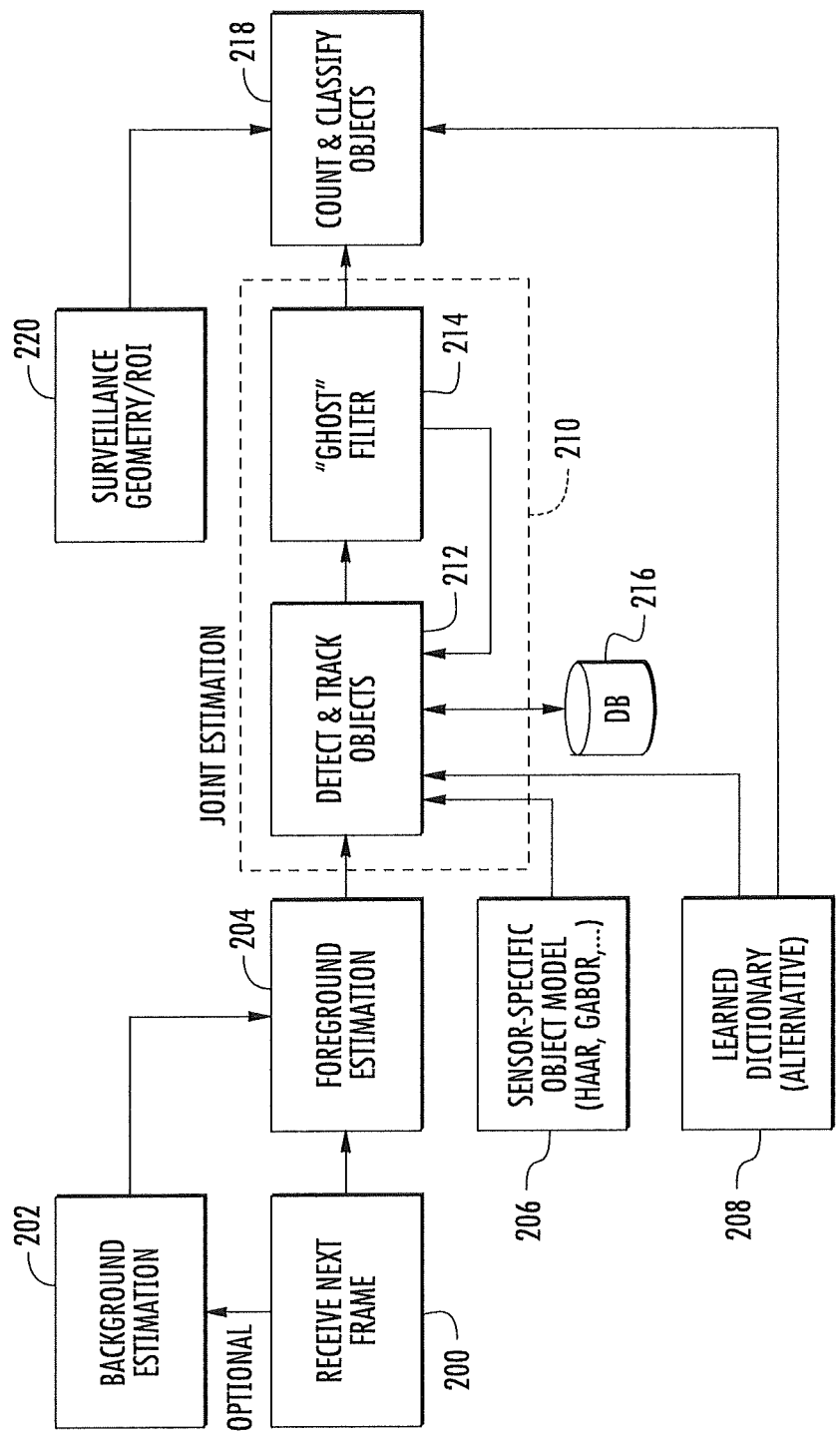
FIG. 7 is a flow chart of a method of operating a second embodiment of the ODT system utilizing a relative intensity (un-chopped) array sensor.

Referring to FIG. 7, one example of a method of operating the ODT system 54 includes, as block 200, receiving the next frame of data from a sensor. The sensor may be a one-dimensional or a two-dimensional array sensor sensing either a projection of a three-dimensional scene or sensing the distance to a point in the scene (i.e., a depth sensor). The sensed phenomena may be electromagnetic at any frequency or acoustic at any frequency. The frame may be received at a periodic rate, on demand from the "Receive Next Frame" function, or at any scheduled, pseudo random, or random rate. Specifically in the case of a depth sensor, the sensor may be a structured light measurement, phase shift measurement, time of flight measurement, stereo triangulation device, light field camera, coded aperture camera, computational imaging technique camera (structure from motion, simultaneous localization and mapping, depth from defocus, etc.), imaging radar, imaging sonar, scanning LIDAR, Flash LIDAR, or similar technology. In the preferred embodiment for presence detection, the sensor is a two-dimensional infrared FPA.

As block 202, a static or a dynamic background is estimated. The background estimate may be performed a priori and may be non-adaptive (e.g., a codebook model). Alternatively, the background estimate may be updated based on the current frame using, for example, a Mixture of Gaussians approach. Other approaches as are well-known in the art may also be used such as simply keeping the previous frame as the background estimate.

As block 204, foreground objects are estimated by comparing the received frame to the background estimate. This step may optionally include various morphological operations (not shown) to, for example, filter noise. In contrast to the chopped mode outlined above, in the un-chopped mode, the preferred background estimation may consist of simply keeping the previous frame. Foreground objects may, then, be estimated by comparing the received frame and the previous frame, preferably by subtraction.

As block 206, in what may be unique to the detection of small objects in low-resolution un-chapped data, is the use of a sensor-specific object model that may be a designed basis that may be a Harr basis. The Harr basis is useful because in un-chopped imagery, a positive response is seen in the direction an object is moving (i.e., pixels are hotter than they were previously) and a corresponding negative response is seen where an object moved from (i.e., pixels are colder than they were previously). This basis may be designed to be over-complete, particularly in rotation angle, to achieve a more sparse, discriminative model. In an alternative embodiment, the basis may be a Gabor basis which may also be over-complete.

In another embodiment and as block 208, an empirical basis may be employed where the basis is learned by discriminative dictionary learning from training data.

As block 210, the detection itself comprises a joint estimation comprising the detection itself (see block 212), a 'ghost' filter (see block 214) to compensate for the specific characteristics of un-chopped imagery, and a database (memory) (see block 216) of where tracked objects were when they stopped moving (i.e., since they disappeared due to the characteristics of an un-chopped sensor). The detection comprises filtering the foreground image with the basis functions and inferring from the filter output the number and location of the objects. Objects, once detected, may be tracked using a Kalman Filter. In one embodiment, a Bayesian Estimator as one type of Kalman Filter is employed. In another embodiment, a Particle Filter as another type of Bayesian Estimator, is employed.

One key characteristic of un-chopped video is that there is a characteristic time that it takes for a temperature of a pixel to increase or decrease to the background temperature. At video frame rates, this may leave a residual image (i.e., a ghost) where a hot object was. This ghost may cause false detection unless appropriately filtered. The detection of a ghost depends on where an object was, and that may be known from the tracking of the object. Thus, an iterative, joint, estimation to detect and track objects may be employed comprising the use of both the described detection and tracking and a ghost filter in a joint estimation process.

Alternatively, the tracking information may not be used and a search procedure may be used instead such as a space adaptive shape suppressor.

As block 218, the detected objects may be counted and classified by any well-known technique with the necessary addition of the Surveillance Geometry or Region of Interest (i.e., the scene) (see block 220). This data may allow the classifier to distinguish between objects that have disappeared because they stopped moving but are still present in the scene, and objects that have disappeared because they left the scene.

Benefits of the present disclosure include a low-cost, accurate, people presence detection and counting for building management systems including energy optimization and security.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of operating an object detection and tracking system comprising:
   estimating a current background of a current frame of sensor data generated by a sensor and based on a previous frame of sensor data by a computer-based processor;
   estimating a foreground of the current frame of sensor data by comparing the current frame of sensor data to the current background; and detecting an object using a sensor-specific object model, wherein the sensor is an absolute intensity sensor utilizing a chopper; and
   tracking the object via a Bayesian Estimator, and wherein the sensor-specific object model is a chopped-data object model, wherein the chopped-data object model is learned by discriminative dictionary learning.

2. The method set forth in claim 1, wherein the chopped-data object model is a Gaussian Mixture object model.

3. The method set forth in claim 1, wherein the chopped-data object model is parameterized at least in-part by perspective data.

4. The method set forth in claim 1, wherein the Bayesian Estimator is a Kalman Filter.

5. The method set forth in claim 1, wherein the Bayesian Estimator is a Particle Filter.

* * * * *